United States Patent [19]
Torii et al.

[11] Patent Number: 5,119,006
[45] Date of Patent: Jun. 2, 1992

[54] METHOD OF DETECTING A COLLISION OF MACHINE OPERATING PARTS DRIVEN BY SERVOMOTORS

[75] Inventors: Nobutoshi Torii, Hachioji; Yasuo Naito, Oshino; Masayuki Hamura, Oshino; Tetsuaki Kato, Oshino, all of Japan

[73] Assignee: Fanuc Ltd., Minamitsuru, Japan

[21] Appl. No.: 432,743

[22] PCT Filed: Mar. 7, 1989

[86] PCT No.: PCT/JP89/00245
§ 371 Date: Oct. 25, 1989
§ 102(e) Date: Oct. 25, 1989

[87] PCT Pub. No.: WO89/08538
PCT Pub. Date: Sep. 21, 1989

[30] Foreign Application Priority Data
Mar. 10, 1988 [JP] Japan .................. 63-54834

[51] Int. Cl.⁵ .................................. B25J 9/00
[52] U.S. Cl. ........................... 318/640; 318/587; 318/568.1; 364/474.2; 395/1
[58] Field of Search .................. 318/560-636, 318/640; 364/513, 474.2, 461, 460; 901/2, 3, 9, 12, 13, 16-23

[56] References Cited
U.S. PATENT DOCUMENTS

| | | | |
|---|---|---|---|
| 4,578,757 | 3/1986 | Stark | 364/513 X |
| 4,580,085 | 4/1986 | Eto et al. | 364/474.2 X |
| 4,638,231 | 1/1987 | Monforte | 318/640 |
| 4,644,237 | 2/1987 | Frushour et al. | 318/640 X |
| 4,685,054 | 8/1987 | Manninen et al. | 364/513 X |
| 4,725,942 | 2/1988 | Osuka | 364/513 X |
| 4,862,373 | 8/1989 | Meng | 364/461 X |
| 4,888,707 | 12/1989 | Shimada | 364/513 |
| 4,906,907 | 3/1990 | Tsuchihashi et al. | 364/513 X |
| 4,908,559 | 3/1990 | Kurakake et al. | 364/513 X |
| 4,922,430 | 5/1990 | Wavish | 364/461 |

Primary Examiner—Paul Ip
Attorney, Agent, or Firm—Staas & Halsey

[57] ABSTRACT

A collision detecting method is provided which is capable of promptly detecting a collision of robot operating parts driven by servomotors, e.g., robot arms, with a foreign object. Prompt detection of such collisions aids in preventing or limiting damage to a machine, etc. by the collision. A digital signal processor of an axis controller (2) of FIG. 1, as part of a software servo system, calculates a velocity command and a torque command in accordance with a movement command supplied from a main computer (1), to periodically carry out servo control for individual axes of the robot. The digital signal processor also determines whether the torque command or a velocity deviation between the velocity command and an actual velocity of a servomotor (13b) is greater than a respective predetermined value. When the torque command or velocity deviation becomes greater than the respective predetermined value, the collision detecting method determines that a collision of the robot operating part (13a) with a foreign object or the like has occurred, and the operation of the servomotor is stopped.

10 Claims, 2 Drawing Sheets

METHOD OF DETECTING A COLLISION OF MACHINE OPERATING PARTS DRIVEN BY SERVOMOTORS

BACKGROUND OF THE INVENTION

1. Field of the Invention

The present invention relates to a collision detecting method capable of prompt detection of a collision of machine operating parts driven by servomotors with a foreign object.

2. Description of Related Art

During operation of a machine, if a foreign object entering the working region of a machine operating part, the foreign object may interfere with the operating part. There is then a possibility of either impeding normal operation of the part or machine or damaging the machine. Conventionally, various methods have been employed to avoid such problems.

For example, a collision of a machine operating part with a foreign object is detected by using a touch sensor mounted to the outer surface of the machine operating part. The use of the sensor, however, entails an increase of the cost of the machine, and it is not possible to detect a collision of the machine operating part with a foreign object occurring outside the operable region of the sensor.

In those types of machines in which the machine operating parts thereof are driven by servomotors, it is known to detect a collision of a machine operating part with a foreign object has been detected by determining whether an increase in driving current for the corresponding servomotor exceeds a predetermined discrimination value. However, there is a passage of time from the detection of a collision until the servomotor driving current reaches the discrimination value. This time lag in collision detection can bring about greater damage to the operating part or machine than if the collision was detected more quickly after its occurrence.

In other types of machines, e.g., industrial robots, a collision discriminating process is carried out by a built-in computer utilizing either a sensor output or the detected value of the servomotor driving current. In these machines, the collision discriminating process is executed by the same computer which is used to control the robot. The robot control, however, involves a variety of complicated data processing operations; accordingly, the time required for the control process and the collision discriminating process of the computer becomes inevitably long. Consequently, additional time is required from collision detection until completion of the collision discriminating process in these machines.

SUMMARY OF THE INVENTION

An object of the present invention is to provide a method which is capable of promptly detecting a collision of a machine operating part driven by servomotor with a foreign object, thus preventing or limiting damage to a machine, etc., due to the collision.

To achieve the above object, the present invention utilizes the following a method of detecting a collision of a machine operating part driven by a servomotor, comprising the steps of: (a) obtaining a collision discriminating parameter relating to a driving force of the servomotor, at first predetermined periods; (b) obtaining an amount of change in the collision discriminating parameter at second predetermined periods; and (c) determining that a collision of the machine operating part has occurred when the amount of change of the collision discriminating parameter, detected in the step (b), becomes greater than a predetermined value.

Preferably, a torque command value supplied to the servomotor or a deviation between a velocity command supplied to the servomotor and an actual velocity of the servomotor is used as the collision discriminating parameter, and the first predetermined period at which the amount of change of this parameter is detected is set to a value shorter than a period of machine control action. Further, the difference between the value of the collision discriminating parameter detected in a previous period and the value of the same parameter detected in a current period is preferred to determine the amount of change in the collision discriminating parameter, at second predetermined periods equal to the first predetermined periods.

According to the present invention, a collision of the machine operating part driven by the servomotor is detected when the amount of change of the collision discriminating parameter, which is detected at predetermined periods, becomes greater than the predetermined value. Therefore, a collision of the machine operating part can be promptly detected without using a special sensor. Also, damage to the machine, etc. due to the collision can be prevented or lessened.

DESCRIPTION OF THE PREFERRED EMBODIMENT

Figure 1:
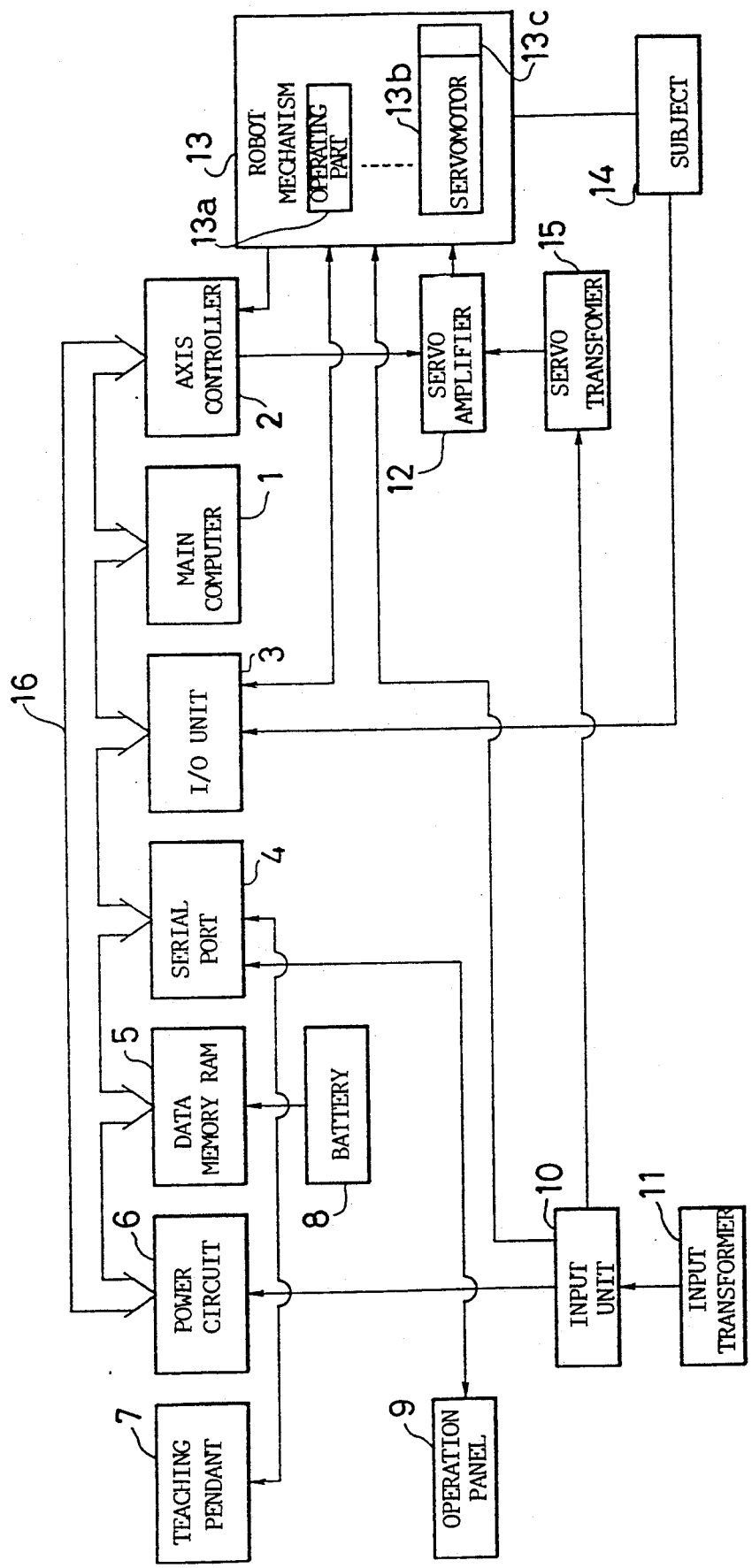
FIG. 1 is a block diagram showing the principal part of an industrial robot to which a collision detecting method according to an embodiment of the invention is applied.

In FIG. 1, an industrial robot has an arrangement fundamentally similar to a conventional one, and comprises a robot mechanism 13 for performing predetermined tasks on a subject 14 having various sensors (not shown), a control unit having various elements described hereinafter, for controlling the robot mechanism 13, and various sensors (not shown).

The robot mechanism 13 has various operating parts, e.g., a set of arms, and an end effector mounted to the distal end of the arm. Each of the operating parts (only one is shown with numeral 13a) is either moved linearly or rotated relative to one or more axes thereof by an associated actuator or actuators. The actuators each comprise a servomotor (only one is shown with numeral 13b) which is preferably provided with a velocity detector 13c.

The control unit comprises a main computer 1 for robot control, which includes a microprocessor, a ROM which stores a control program executed by the microprocessor, a RAM for temporary storage of data, etc. The main computer 1 is arranged to deliver movement commands for the individual axes of the robot.

Figure 2:
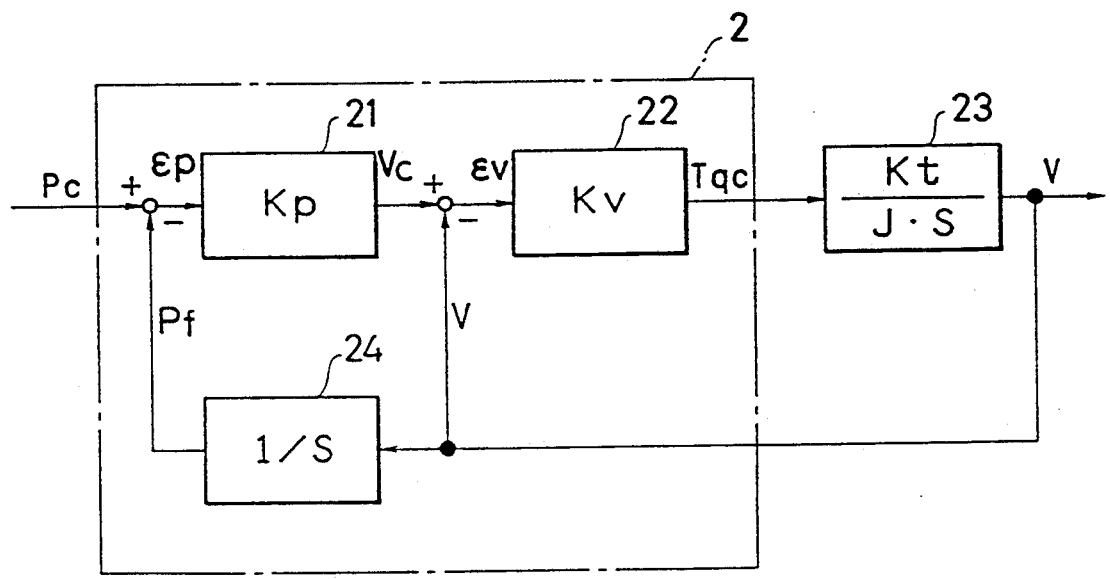
FIG. 2 is a block diagram showing, in terms of transfer functions, the control characteristic of a servo system for one axis of the robot.

An axis controller 2 cooperates with the individual servomotors of the robot and servo amplifiers associated therewith (one of which is illustrated with numeral 12), to constitute digital servo systems for the respective axes, i.e., software servo systems. Specifically, the axis controller 2 has a digital signal processor (not shown) having a position control function 21, a velocity control function 22, and an integrating function 24 shown in FIG. 2. The digital signal processor is arranged to deliver a torque command in accordance with the movement command supplied from the main computer 1 to a servo amplifier which cooperates with the associated servomotor to provide the control characteristic 23 shown in FIG. 2. In FIG. 2, symbols Kp and Kv respectively denote the position loop gain and the velocity loop gain of the axis controller 2, Kt denotes the torque constant of the servomotor, and J denotes the total inertia acting on the output shaft of the servomotor.

The control unit further comprises an I/O unit 3 connected to the various sensors of the robot, the various actuators, and the various sensors of the work subject 14; a serial port 4 connected to a teaching pendant 7 and an operation panel 9; a RAM 5 as a data memory with a backup battery 8; and a power circuit 6 to which electric power is supplied through an input transformer 11 and an input unit 10. Further, the control unit is arranged so that electric power is supplied to the main computer 1 and the above elements 2-5 connected to the computer 1, through the power circuit 6, and to the robot mechanism 13 through the input unit 10. Electric power is also supplied to the servo amplifiers 12 through the input unit 10 and the servo transformer 15.

The operation of the robot constructed as explained above will now be described.

Before starting the robot, an uses operates the teaching pendant 7 and the operation panel 9 to teach the robot in a conventional manner. The results of the teaching operation are stored as teaching data in the RAM 5.

When the robot is in operation, the main computer 1 successively executes various control actions at predetermined periods. The control actions include, e.g., a process of calculating movement commands for the individual axes of the robot in accordance with the teaching data stored in the RAM 5.

The digital signal processor of the axis controller 2 carries out position control, velocity control and torque control (servo control action) for the individual axes of the robot and a collision discriminating action at periods shorter than those of the control actions of the main computer 1. In a given control action period, the digital signal processor integrates the output of the velocity detector 13c mounted on a servomotor 13b, as shown by reference numeral 24 in FIG. 2. The output of the velocity detector 13c; relates to the aforesaid control action period and represents the velocity V of this servomotor. The actual rotational position Pf of the servomotor 13b calculated from this output, and a velocity command Vc for this servomotor is generated as the difference (position deviation) $\epsilon p$ between the command position (movement command) Pc from the main computer 1 and the actual motor position Pf. The digital signal processor then calculates a torque command Tqc in accordance with the difference (velocity deviation) $\epsilon v$ between the calculated velocity command Vc and the actual motor velocity V. The digital signal processor then converts the; command Tqc to an analog signal, and outputs the resultant signal to the servo amplifier 12. The servo amplifier 12 causes a driving current corresponding to the torque command Tqc to flow through the servomotor 13b to rotate the servomotor at the velocity V, thereby driving the associated robot operating part 13a.

During operation of the robot, the digital signal processor of the axis controller 2 carries out the collision discriminating action preferably in each of the above-mentioned periods of the servo control action (or at least once per several periods of the servo control action). The difference $|\epsilon v - \epsilon v'|$ between the velocity deviation $\epsilon v'$ calculated in the previous period (generally, calculated several periods and the velocity deviation $\epsilon v$ calculated in the current period is obtained. Alternatively, the difference $|Tqc - Tqc'|$ between the torque command Tqc' calculated in the previous period and the torque command Tqc calculated in the current period (generally, the amount of change of the velocity deviation or of an equivalent torque command within a plurality of periods of the servo control action) is obtained. Then, a discrimination operation determines; whether the obtained difference (the amount of change) is greater than the corresponding predetermined value which is set to a value greater than the maximum value which would be used during normal operation of the robot. If the difference (the amount of change) $|\epsilon v - \epsilon v'|$ or $|Tqc - Tqc'|$ is smaller than the corresponding predetermined value, it is judged that no collision has occurred between the robot operating part 13 and a foreign object. The velocity deviation $\epsilon v$ or Tqc calculated in the current period is stored in the corresponding register in the digital signal processor, thus completing the collision discriminating action for the current period.

If the robot operating part 13a collides, e.g., with a foreign object which has entered the working region of the operating part, the actual rotational velocity V of the servomotor 13b decreases. In such a case, the velocity deviation $\epsilon v$ ($=Vc-V$) calculated by the digital signal processor in the period of servo control action immediately after the collision is suddenly increased and thus the torque command Tqc sent by the processor is also suddenly increased. Accordingly, in this period of the servo control action (generally, one to several periods later), the difference (the amount of change) $|\epsilon v - \epsilon v'|$ or $|Tqc - Tqc'|$ becomes greater than the corresponding predetermined value, whereby the digital signal processor determines that a collision has occurred. In this case, the processor sets the value Tqc of the torque command register to "O" so that no driving current is supplied to the servomotor 13b thus stopping motor rotation.

By the collision detection method described above, a collision can be detected in the servo control action period immediately after the occurrence of the collision (or some number of servo control action periods later, depending on the desired embodiment). Accordingly the time lag in collision detection is equal to one period of the servo control action (or an acceptable number of periods) of the digital signal processor at most. As a result, the collision detection is faster than using the main computer 1 for collision detection purposes.

What is claimed is:

1. A method of detecting a collision of a machine operating part driven by a servomotor, comprising the steps of:
   (a) detecting a predetermined collision discriminating parameter relating to a driving force of the servomotor at first predetermined periods;
   (b) detecting an amount of change of said collision discriminating parameter at second predetermined periods; and
   (c) determining that the collision of the machine operating part has occurred when the amount of change of the collision discriminating parameter detected in said step (b) becomes greater than a predetermined value.

2. The method according to claim 1, wherein the machine has a main computer, and wherein said step (a) comprises setting the first predetermined period to a value shorter than a period at which various control actions, including an output of a movement command to the servomotor, are carried out by the main computer of the machine to which said method is applied.

3. The method according to claim 1, wherein said step (b) utilizes the second predetermined period by setting it to a value equal to the first predetermined period of said step (a), and wherein said step (b) comprises detecting a difference between a value of the collision discriminating parameter detected in a previous predetermined period and a value of the same parameter detected in a current predetermined period.

4. A method of detecting a collision of a machine operating part driven by a servomotor, comprising the steps of:
   (a) detecting a predetermined collision discriminating parameter relating to a driving force of the servomotor at first predetermined periods;
   (b) detecting an amount of change of said collision discriminating parameter at second predetermined periods; and
   (c) determining that the collision of the machine operating part has occurred when the amount of change of the collision discriminating parameter detected in said step (b) becomes greater than a predetermined value,
   wherein said steps (a)–(c) utilize the collision discriminating parameter comprising a torque command value supplied to the servomotor.

5. A method of detecting a collision of a machine operating part driven by a servomotor, comprising the steps of:
   (a) detecting a predetermined collision discriminating parameter relating to a driving force of the servomotor at first predetermined periods;
   (b) detecting an amount of change of said collision discriminating parameter at second predetermined periods; and
   (c) determining that the collision of the machine operating part has occurred when the amount of change of the collision discriminating parameter detected in said step (b) becomes greater than a predetermined value,
   wherein said steps (a)–(c) utilize the collision discriminating parameter comprising a deviation between a velocity command supplied to the servomotor and an actual velocity of the servomotor.

6. A method of detecting a collision of a machine operating part driven by a servomotor, comprising the steps of:
   (a) detecting a predetermined collision discriminating parameter relating to a driving force of the servomotor at first predetermined periods;
   (b) detecting an amount of change of said collision discriminating parameter at second predetermined periods; and
   (c) determining that the collision of the machine operating part has occurred when the amount of change of the collision discriminating parameter detected in said step (b) becomes greater than a predetermined value,
   wherein the machine has a main computer,
   wherein said step (a) comprises setting the first predetermined period to a value shorter than a period at which various control actions, including an output of a movement command to the servomotor, are carried out by the main computer of the machine to which said method is applied, and
   wherein said steps (a)–(c) utilize the collision discriminating parameter comprising a torque command value supplied to the servomotor.

7. A method of detecting a collision of a machine operating part driven by a servomotor, comprising the steps of:
   (a) detecting a predetermined collision discriminating parameter relating to a driving force of the servomotor at first predetermined periods;
   (b) detecting an amount of change of said collision discriminating parameter at second predetermined periods; and
   (c) determining that the collision of the machine operating part has occurred when the amount of change of the collision discriminating parameter detected in said step (b) becomes greater than a predetermined value,
   wherein said step (b) utilizes the second predetermined period by setting it to a value equal to the first predetermined period of said step (a), and
   wherein said step (b) comprises detecting a difference between a value of the collision discriminating parameter detected in a previous predetermined period and a value of the same parameter detected in a current predetermined period, and
   wherein said steps (a)–(c) utilize the collision discriminating parameter comprising a torque command value supplied to the servomotor.

8. A method of detecting a collision of a machine operating part driven by a servomotor, comprising the steps of:
   (a) detecting a predetermined collision discriminating parameter relating to a driving force of the servomotor at first predetermined periods;
   (b) detecting an amount of change of said collision discriminating parameter at second predetermined periods; and
   (c) determining that the collision of the machine operating part has occurred when the amount of change of the collision discriminating parameter detected in said step (b) becomes greater than a predetermined value,
   wherein the machine has a main computer,
   wherein said step (a) comprises setting the first predetermined period to a value shorter than a period at which various control actions, including an output of a movement command to the servomotor, are carried out by the main computer of the machine to which said method is applied, and
   wherein the collision discriminating parameter comprises a deviation between a velocity command supplied to the servomotor and an actual velocity of the servomotor.

9. A method of detecting a collision of a machine operating part driven by a servomotor, comprising the steps of:
   (a) detecting a predetermined collision discriminating parameter relating to a driving force of the servomotor at first predetermined periods;
   (b) detecting an amount of change of said collision discriminating parameter at second predetermined periods; and (c) determining that the collision of the machine operating part has occurred when the amount of change of the collision discriminating parameter detected in said step (b) becomes greater than a predetermined value, wherein said step (b) utilizes the second predetermined period by setting it to a value equal to the first predetermined period of said step (a), wherein said step (b) comprises detecting a difference between a value of the collision discriminating parameter detected in a previous predetermined period and a value of the same parameter detected in a current predetermined period, and wherein the collision discriminating parameter comprises a deviation between a velocity command supplied to the servomotor and an actual velocity of the servomotor.

10. The method according to claim 1, wherein said steps (a)–(c) utilize the collision discriminating parameter comprising a deviation between a command position and an actual position of the servomotor.

* * * * *